US007036612B1

(12) United States Patent
Raymond et al.

(10) Patent No.: US 7,036,612 B1
(45) Date of Patent: May 2, 2006

(54) CONTROLLABLE MAGNETO-RHEOLOGICAL FLUID-BASED DAMPERS FOR DRILLING

(75) Inventors: David W. Raymond, Edgewood, NM (US); Mostafa Ahmed Elsayed, Youngsville, LA (US)

(73) Assignee: Sandia Corporation, Albuquerque, NM (US)

( * ) Notice: Subject to any disclaimer, the term of this patent is extended or adjusted under 35 U.S.C. 154(b) by 81 days.

(21) Appl. No.: 10/465,505

(22) Filed: Jun. 18, 2003

(51) Int. Cl.
*F21B 17/00* (2006.01)
*F16F 9/53* (2006.01)

(52) U.S. Cl. .................. 175/321; 175/320; 188/267; 188/267.1; 188/267.2

(58) Field of Classification Search ................ 175/320, 175/321; 166/65.1, 66.5; 188/267, 267.1, 188/267.2
See application file for complete search history.

(56) References Cited

U.S. PATENT DOCUMENTS

| | | | | |
|---|---|---|---|---|
| 4,439,167 A | * | 3/1984 | Bishop et al. | 464/20 |
| 5,227,281 A | * | 7/1993 | Gaschler et al. | 430/325 |
| 5,277,281 A | * | 1/1994 | Carlson et al. | 188/267 |
| 6,464,051 B1 | * | 10/2002 | Lisenker et al. | 188/267.2 |

OTHER PUBLICATIONS

Elsayed, M.A., et al., "Effect of Downhole Assembly and Polycrystalline Diamond Compact (PDC) Bit Geometry on Stability of Drillstrings," *Journel of Energy Resources Technology*, vol. 119, pp 159-163 (Sep. 1997).

Elsayed, M.A., "Correlation Between Bit Chatter, Weight on the Bit, and Rate of Penetration in Drillstrings Equipped with PDC Bits," *ASME ETCE Conference Proceedings*, Houston TX, pp 1-8 (1999).

Elsayed, M.A., et al., "Measurement and Analysis of Chatter in a Compliant Model of a Drillstring Equipped with a PDC Bit," *ASME ETCE Conference Proceedings*, New Orleans LA, pp 1-8 (2000).

Elsayed, M.A., et al., "Analysis of Coupling Between Axial and Torsional Vibration in a Compliant Model of a Drillstring Equipped with a PDC Bit," *ASME ETCE Conference Proceedings*, Houston TX, paper #ETCE 2002/Struc-29002 (Feb. 2002), pp. 1-8.

Glowka, D.A., "Use of Single-Cutter Data in the Analysis of PDC Bit Designs: Parts 2—Development and Use of the PDCWEAR Computer Code," *J. Petroleum Technology*, pp 850-859 (Aug. 1989).

Thompson, William T., Textbook: Theory of Vibration with Applications, Prentice-Hall, Inc., Englewood Cliffs, NJ, table of contents (1981).

* cited by examiner

*Primary Examiner*—David Bagnell
*Assistant Examiner*—Giovanna M. Collins
(74) *Attorney, Agent, or Firm*—Jeffrey D. Myers; Robert D. Watson

(57) ABSTRACT

A damping apparatus and method for a drillstring comprising a bit comprising providing to the drillstring a damping mechanism comprising magnetorheological fluid and generating an electromagnetic field affecting the magnetorheological fluid in response to changing ambient conditions encountered by the bit.

26 Claims, 18 Drawing Sheets

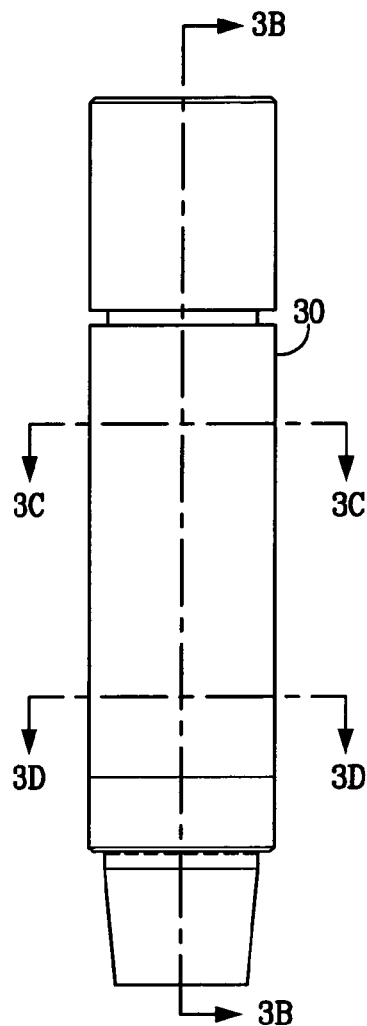
FIG. 3A
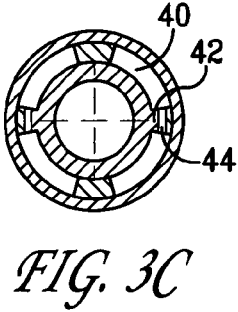
FIG. 3C
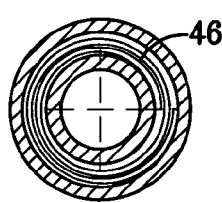
FIG. 3D
FIG. 3D

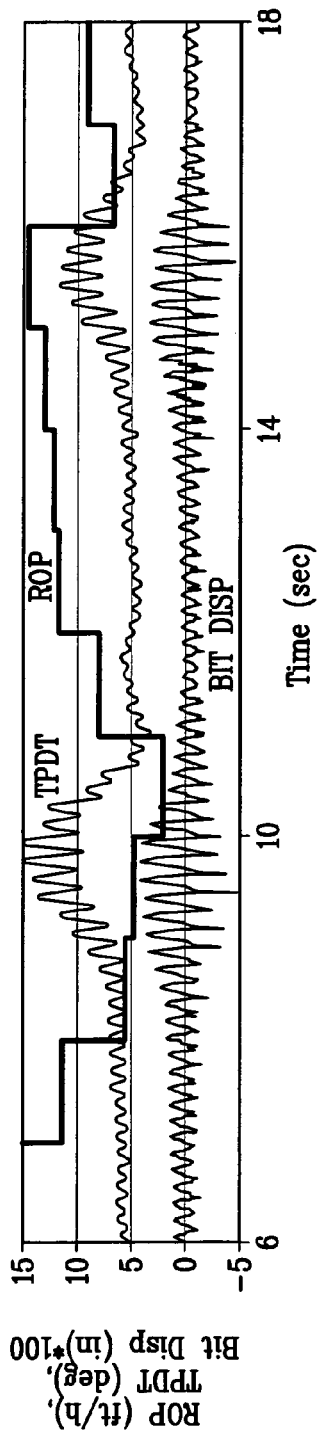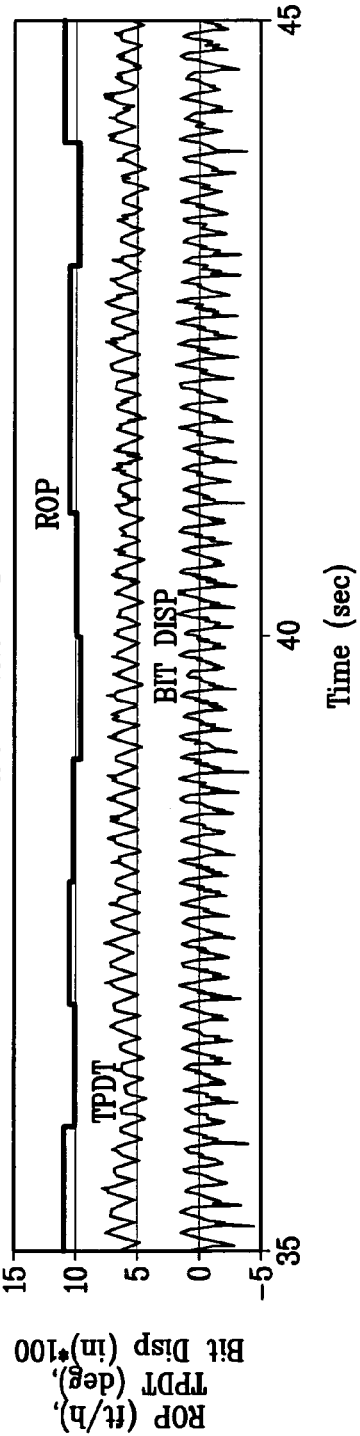

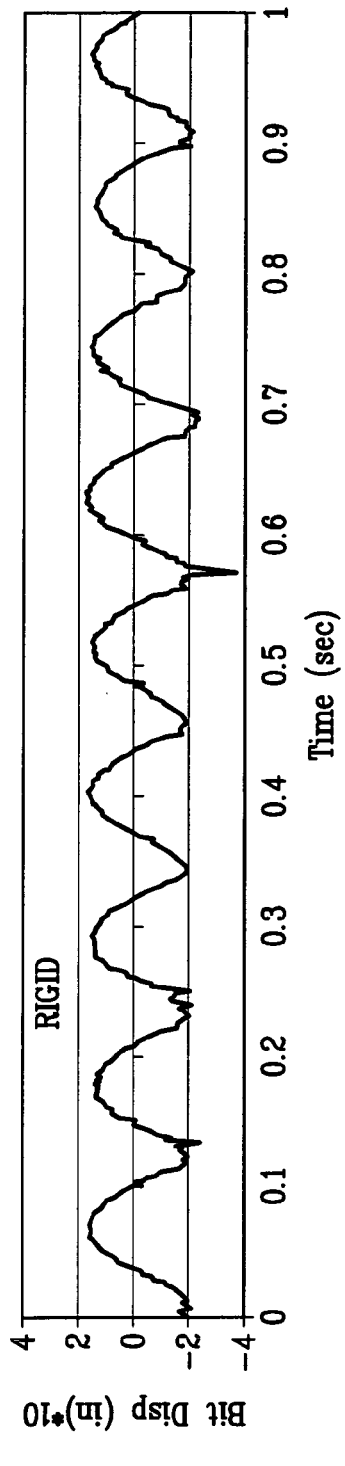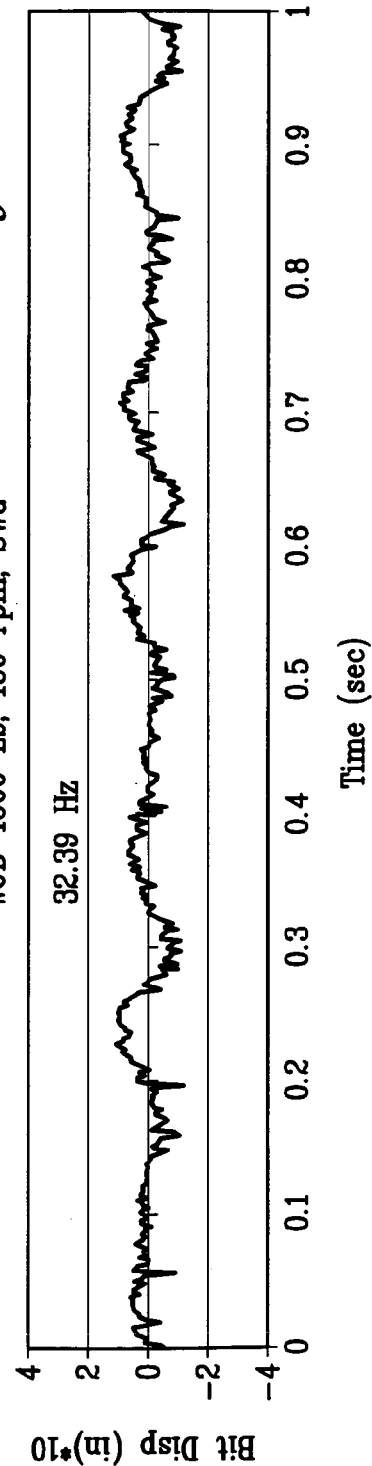

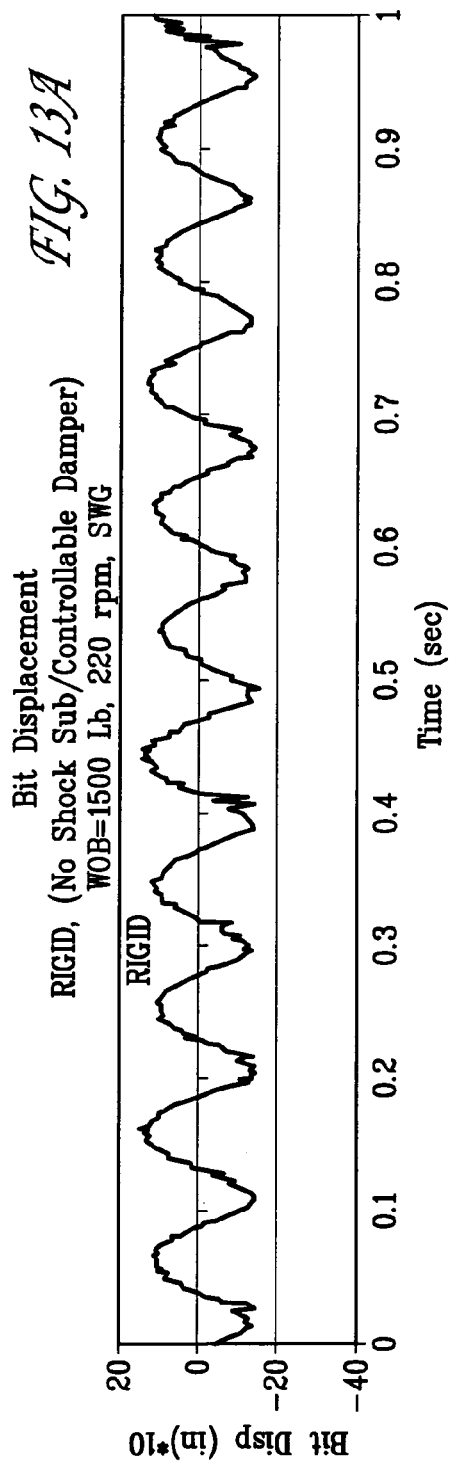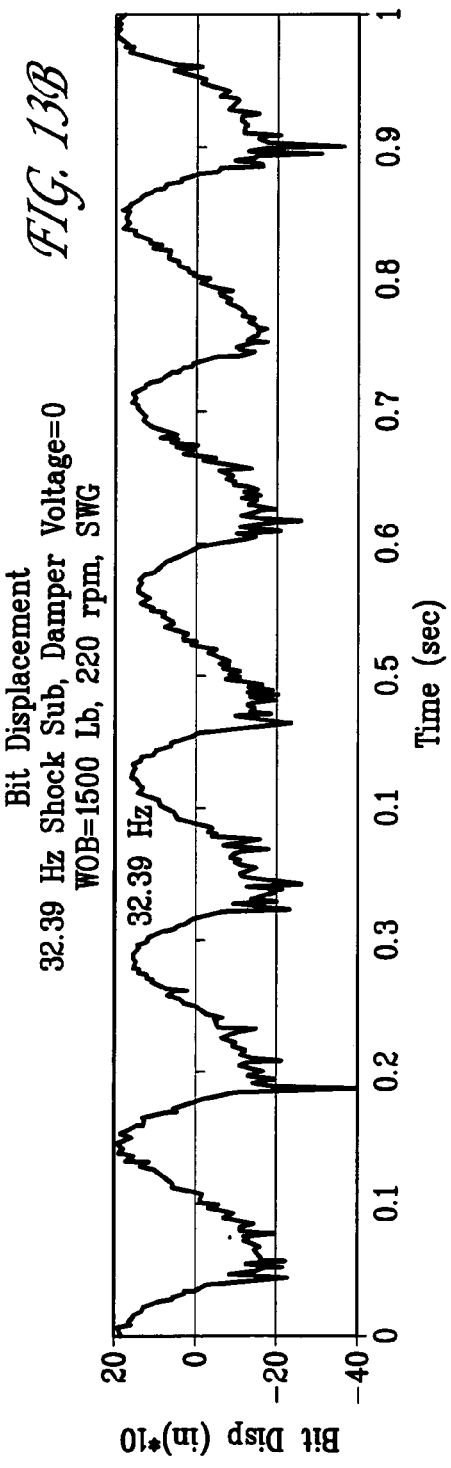

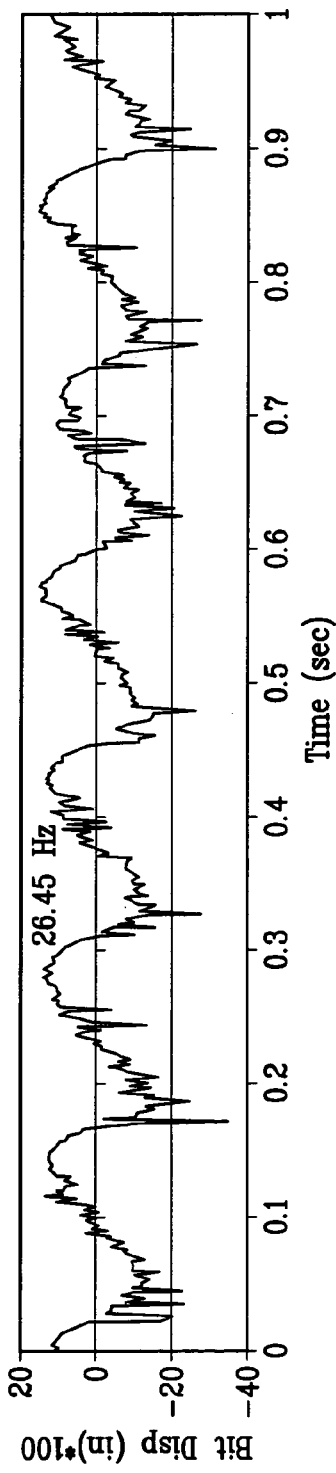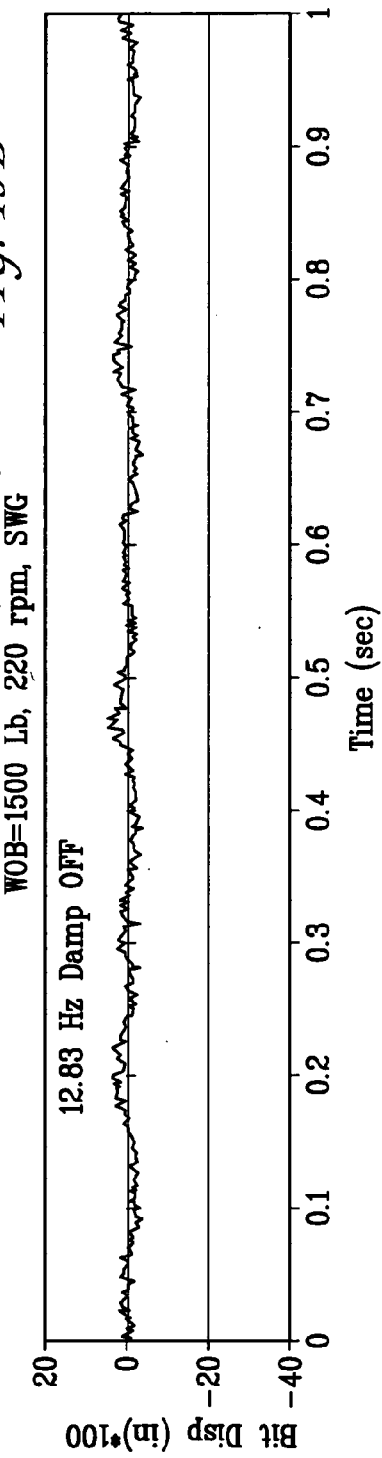

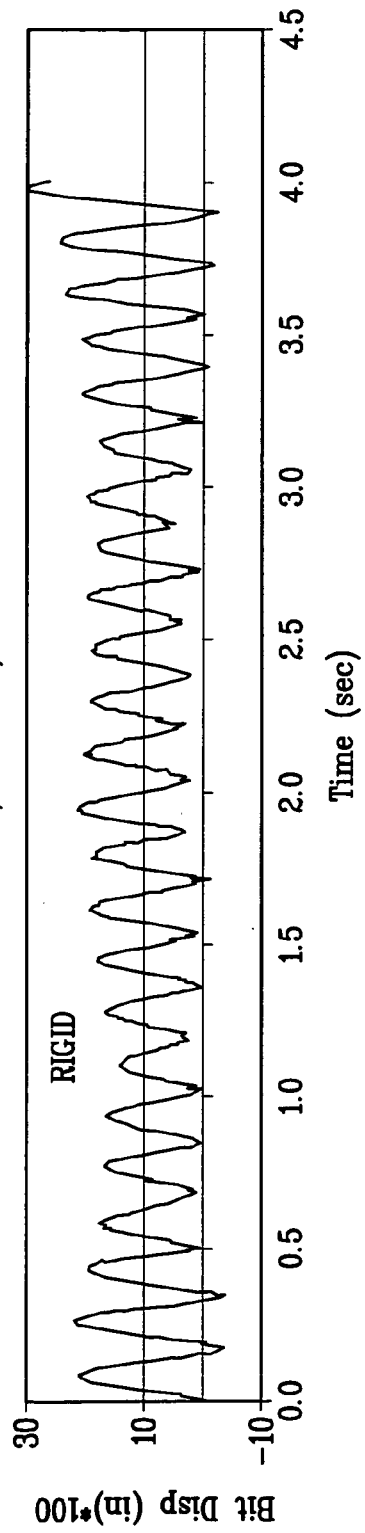
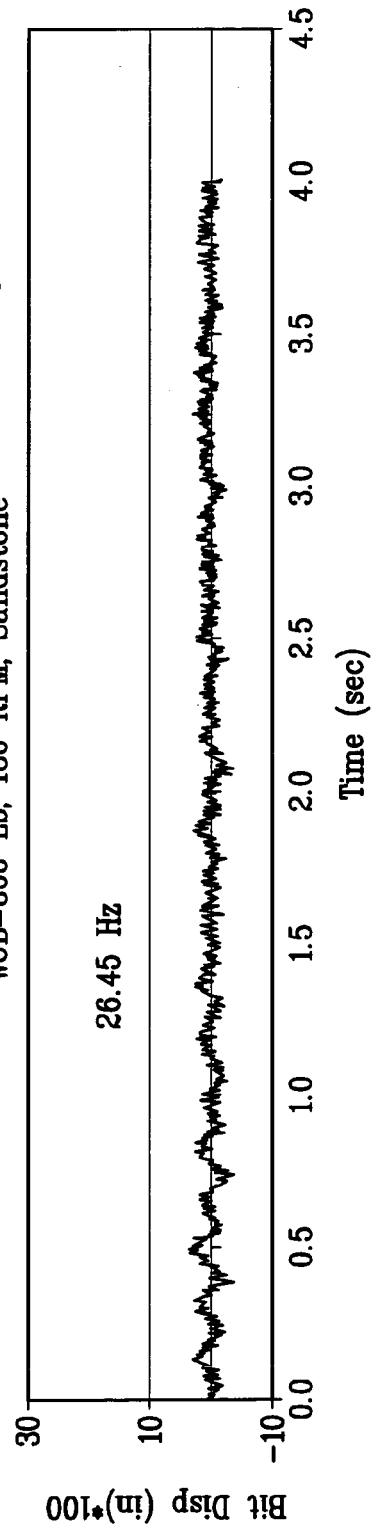

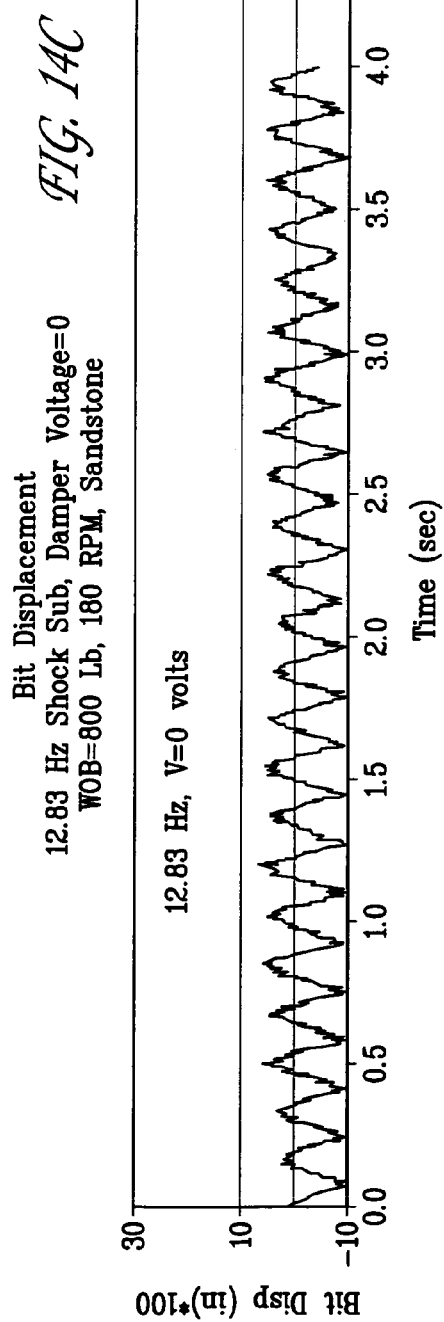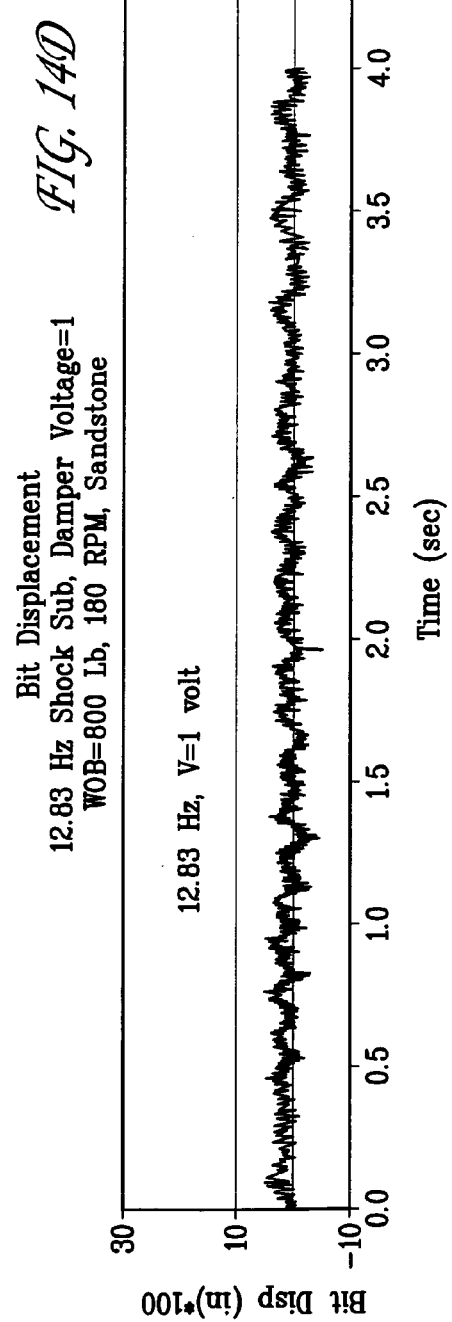

CONTROLLABLE MAGNETO-RHEOLOGICAL FLUID-BASED DAMPERS FOR DRILLING

GOVERNMENT RIGHTS

The Government has rights to this invention pursuant to Contract No. DE-AC04-94AL85000 awarded by the U.S. Department of Energy.

BACKGROUND OF THE INVENTION

1. Field of the Invention (Technical Field):

The present invention relates to methods and apparatuses for prevention of vibration in drillstrings used for drilling/earth-boring applications.

2. Background Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Chatter and other forms of vibration cause failure of the cutter portion of drillstrings and concomitant costs in parts and repair time (during which drilling is halted). In particular, failures of Polycrystalline Diamond Compact ("PDC") cutters and damage to the bottom hole assembly are of concern, which often occur in hard rock such as Sierra White Granite ("SWG"). Accordingly, a great deal of effort has been expended in minimizing vibrations of various types in drillstrings. Of particular concern are self-excited vibrations (chatter) in the longitudinal direction, and some work has been done on detection and suppression of chatter in drillstrings, see, e.g., Y. Tarng, et al., "Adaptive Pattern Recognition of Drilling Chatter", *Journal of Materials Processing Technology* 48:247–253 (1995); Y. Tarng, et al., "Detection and Suppression of Drilling Chatter", *Journal of Dynamic Systems, Measurement, and Control* 116:729–734 (1994); and Y. Tarng, et al., "On-Line Drilling Chatter Recognition and Avoidance Using an ART2—A Neural Network", *Int. J. Mach. Tools Manufact.* 34:949–957 (1994), although without great success.

Even though there are many types of vibrations encountered during drilling, such as bit whirl, chatter has only recently received attention as one of the main causes of failure in PDC bits, particularly in hard rock formations such as SWG. See, e.g., M. Elsayed, et al., "Effect of Downhole Assembly and Polycrystalline Diamond Compact (PDC) Bit Geometry on Stability of Drillstrings", *ASME Journal of Energy Resources Technology* 119:159–163 (1997). Sandia National Laboratories has led an effort to investigate the cutting forces in PDC bits, D. Glowka, "Use of Single-Cutter Data in Analysis of PDC Designs: Part 2—Development and Use of PDCWEAR Computer Code", *Journal of Petroleum Technology* pp: 850–859 (August, 1989) and recently by measuring chatter during drilling using their Hard Rock Drilling Facility ("HRDF") showed the detrimental effect of chatter on the life of PDC bits. M. Elsayed, "Correlation Between Bit Chatter, Weight on the Bit and the Rate of Penetration in Drillstrings Equipped with PDC Bits", *ASME ETCE Conference Proceedings*, Houston, Tex., pp. 1–8 (1999); and M. Elsayed, et al., "Measurement and Analysis of Chatter in a Compliant Model of a Drillstring Equipped with a PDC Bit", *ASME ETCE Conference Proceedings*, New Orleans, La., pp. 1–8 (2000). Even though it was shown that the proper combination of weight on bit ("WOB"), rotating speed and bit design reduces the axial chatter, added means of controlling these vibrations under field conditions are needed. This is particularly important since the dynamics of drillstrings are constantly varying with the drilling depth. Moreover, rock properties vary and unexpected variations in rock hardness is common. Sudden changes in load as the bit transitions a soft-to-hard rock boundary is often sufficient to induce drillstring instability.

Shock absorbers, otherwise referred to as shock subs, have been used in drillstrings to suppress vibrations. Also, fluids (mainly "passive" fluids, i.e., those whose properties are not controlled once installed in the shock sub) have been used to provide friction (damping) in these devices. Technology in this area includes: U.S. Pat. No. 6,394,198, to Hall et al., entitled "Frictional Vibration Damper for Downhole Tools"; and U.S. Pat. No. 6,364,775, to Rohs et al., entitled "Torsion Vibration Damper and Process for its Manufacture".

MR fluids have been used in conjunction with a drillstring in U.S. Pat. No. 6,257,356, to Wassell, entitled "Magnetorheological Fluid Apparatus, Especially Adapted for Use in a Steerable Drill String, and a Method of Using Same" (filed Apr. 27, 2001), U.S. Patent Publication No. 2002/0011358, to Wassell, entitled "Steerable Drill String" (Jan. 31, 2002), and PCT Application Ser. No. US01/25586, to Wassell, entitled "Steerable Drill String" (Apr. 12, 2001). These disclose use of MR fluid in a device to steer the drillstring to drill in a given direction, with no mention or suggestion of vibration suppression capability.

The present invention introduces damping at the cutting end of the drillstring to reduce chatter and other vibrations via controllable Magneto-Rheological ("MR") fluid dampers coupled with the altering of the damping constant through variation in a control voltage. Reduction in bit vibration also results in an increase in the rate-of-penetration ("ROP"), with resulting increase in drilling efficiency and reduction in drilling cost.

SUMMARY OF THE INVENTION
(DISCLOSURE OF THE INVENTION)

The present invention is of a damping apparatus and method for a drillstring comprising a bit, comprising: providing to the drillstring a damping mechanism comprising magnetorheological fluid; and generating an electromagnetic field affecting the magnetorheological fluid in response to changing ambient conditions encountered by the bit. The invention preferably dampens longitudinal vibrations and preferably additionally dampens rotational vibrations. Two damping mechanisms in series may be employed together with one or more electromagnetic fields affecting the magnetorheological fluid in both damping mechanisms. The invention alternatively may dampen only rotational vibrations. The magnetorheological fluid is preferably housed in a chamber comprising an orifice between two sections of the chamber. An electromagnetic coil is then employed proximate the orifice.

The invention is also of a damping apparatus and method for a drillstring comprising a bit, comprising: providing a damping mechanism comprising means providing frictional properties that are alterable while the drillstring is in use; and controlling the frictional properties based upon changing ambient conditions encountered by the bit. The invention preferably dampens longitudinal vibrations and preferably additionally dampens rotational vibrations. Two damping mechanisms in series may be employed. The invention alternatively may dampen only rotational vibrations. The means providing frictional properties is preferably a magnetorheological fluid, preferably housed in a chamber comprising an orifice between two sections of the chamber. An electromagnetic coil is then employed proximate the orifice.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIGS. 3(a)–(d) are vertical and horizontal section views of a rotational vibration damper according to the invention;

FIG. 11 is a plot of bit longitudinal displacement, bit rotational displacement and rate of penetration versus time for a bit with a controllable damper shock-sub as the control voltage to the damper is modulated (800 lb. WOB and 180 RPM in Sierra White Granite);

FIGS. 12(a)–(d) are plots of bit longitudinal displacement versus time for a bit with a rigid drillstring (no shock sub/controllable damper) and a drillstring with variable spring rates in a controllable damper shock-sub (1500 lb. WOB and 180 RPM in Sierra White Granite);

FIGS. 13(a)–(d) are plots of bit longitudinal displacement versus time for a bit with a rigid drillstring (no shock sub/controllable damper) and a drillstring with variable spring rates in a controllable damper shock-sub (1500 lb. WOB and 220 RPM in Sierra White Granite);

FIGS. 14(a)–(d) are plots of bit longitudinal displacement versus time for a bit with a rigid drillstring (no shock sub/controllable damper) and a drillstring with variable spring rates in a controllable damper shock-sub and a controllable damper shock-sub with a modulated control voltage (800 lb. and 180 RPM in Sandstone)

DESCRIPTION OF THE PREFERRED EMBODIMENTS

Best Modes for Carrying out the Invention

The present invention is of a method and apparatus for reducing vibrations (particularly chatter) in drillstrings. Controllable Magneto-Rheological ("MR") fluid dampers are employed proximate the cutting end of the drillstring, coupled with the altering of the damping constant through variation in a control voltage. In the preferred embodiment of the invention, both axial and torsional vibrations are dampened, and alternative embodiments provide only one or the other. The invention preferably includes down-hole electronics, although control through direct connection to a surface controller is possible. Electrical power for controllability would be provided through a local source such as a storage cell or mudflow-driven generator.

MR fluids are produced by the Lord Corporation (Cary, N.C.) and have been introduced in several devices for commercial use. See, e.g., Lord Materials Division Engineering Notes titled "Magnetic Circuit Design" and "Designing with MR Fluids"; M. Jolly, et al., "Properties and Applications of Commercial Magnetorheological Fluids", Thomas Lord Research Center; M. Jolly, "Pneumatic Motion Control Using Magnetorheological Fluid Technology", Thomas Lord Research Center; and J. Carlson, et al., Commercial Magneto-Rheological Fluid Devices", Lord Corporation. In particular, a linear damper (RD-1005) is used in a system to control vibrations in the seat suspension of large on- and off-highway vehicles, thereby increasing driver comfort and minimizing fatigue. Another application is for a rotary device to change resistance in exercise bicycles. The principle in all of these devices is that the MR fluid is fundamentally a suspension of micron-size magnetic particles. These particles respond to a magnetic field by aligning themselves along magnetic lines. The strength of the magnetic field is determined by a current generated by applying a voltage to a coil. As the damper moves, the MR fluid is forced through an orifice. The friction in the orifice is a function of the current through the coil. At 2 Amps, the MR fluid is near solid. A control voltage (0–5 volts) can be applied to a controller which varies the coil voltage from 0 to 10 volts which, in turn, varies the applied current from 0 to its maximum value of 2 Amps.

Figure 1:
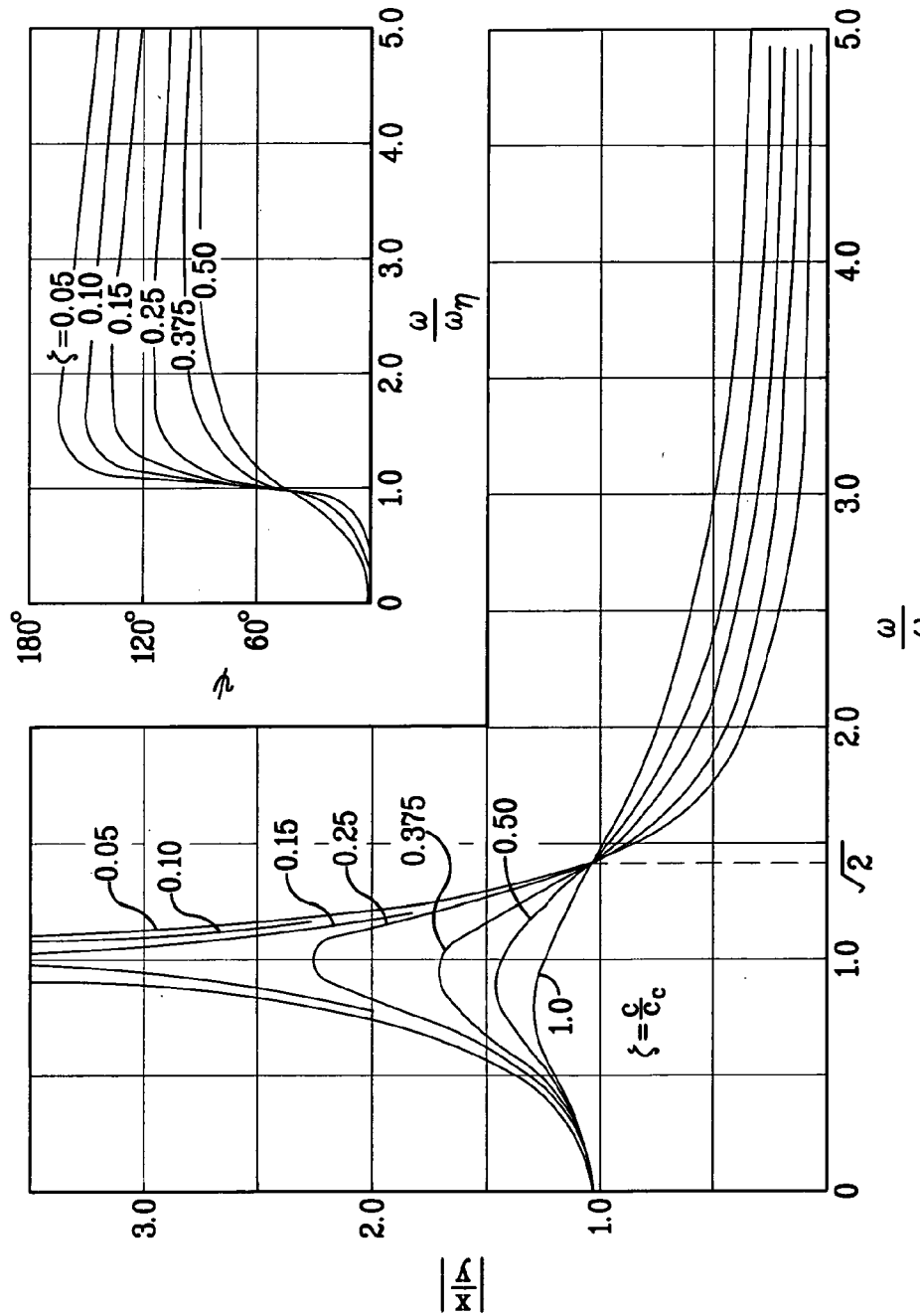
FIG. 1 is a graph of known system/support response at various damping levels, the horizontal axis representing the ratio between the vibration frequency and the natural frequency of the system and the vertical axis representing the ratio of the transmitted displacement and the applied displacement. The latter is also the ratio of the transmitted force to the applied force.

Vibration in the bit of a drillstring produces an undulated surface in the rock. This in turn produces a time-variant force that feeds back into the vibration of the bit and drillstring. In some sense, this is analogous to support motion wherein the system damping affects the vibration response of the remainder of the drillstring. At low frequencies, high damping is desirable to reduce the vibration transmitted into the drillstring. However, lower damping is required at high frequencies. This is illustrated in FIG. 1, from W. Thomson, *Theory of Vibration with Applications* (2d ed., Prentice-Hall, 1981).

Figure 2A:
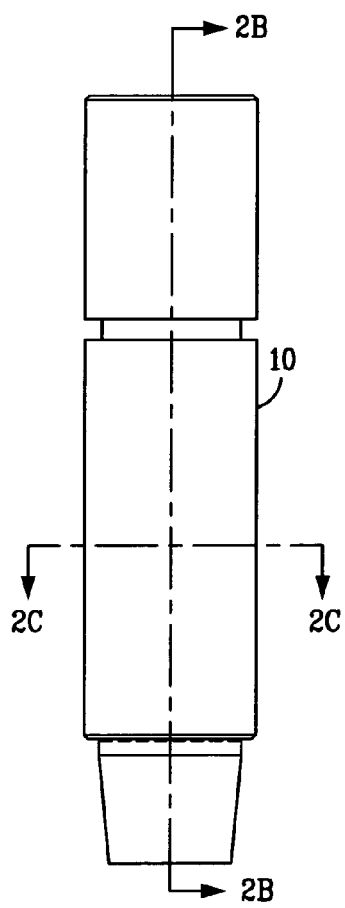
FIGS. 2(a)–(c) are vertical and horizontal section views of a longitudinal vibration damper according to the invention.
Figure 2C:
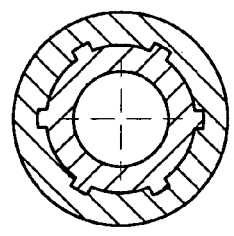
Figure 2B:
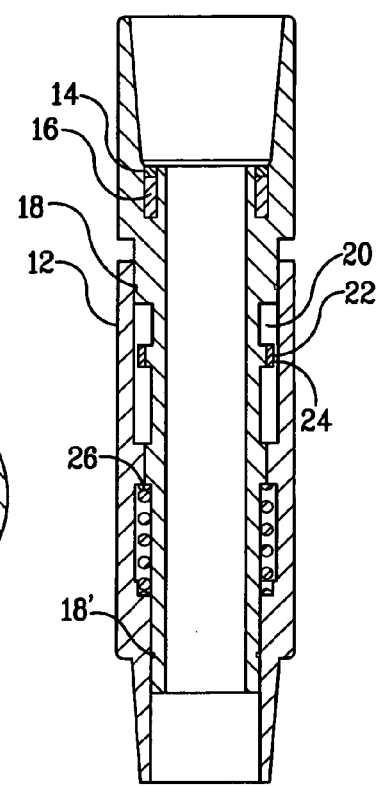

A damper according to the invention is preferably installed in place of the bit sub portion of a drillstring. FIG. 2 illustrates the preferred damper 10 of the invention for suppressing longitudinal (axial) vibrations. Housed within body 12 are seals 14, coil controller 16, seals 18,18', magnetorheological fluid 20, electromagnetic coil 22, annular orifice 24, and spring 26. Other means for generating electromagnetic fields to alter properties of the magnetorheological fluid can, of course, be employed. The coil controller preferably comprises a sensing element that detects vibration level and a control element that alters the control voltage to a value based on the sensed level of vibrations. The coil controller responds to sensor inputs relating to bit movement and appropriately alters the damping properties of the magnetorheological fluid via the electromagnetic coil. This is within the skill of one of ordinary skill in the art based upon the properties/calibration of the damper and expected drilling conditions.

FIG. 3 illustrates the preferred damper 30 of the invention for suppressing rotational (torsional) vibrations. Housed within body 32 are seals 34, coil controller 36, seals 38,38', magnetorheological fluid 40, electromagnetic coil 42, orifice 44, spiral power spring 46, bearing 48, and locknut 50. Other means for generating electromagnetic fields to alter properties of the magnetorheological fluid can, of course, be employed. The coil controller preferably comprises similar components to the axial damper except for the fact that the sensed quantity is torsional vibrations. The coil controller responds to sensor inputs relating to bit torsional vibrations and appropriately alters the damping properties of the magnetorheological fluid via the electromagnetic coil. This is within the skill of one of ordinary skill in the art based upon the properties/calibration of the damper and expected drilling conditions.

Figure 4A:
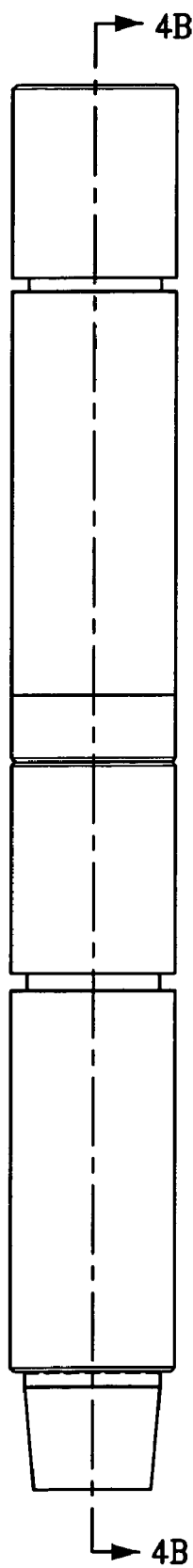
FIGS. 4(a)–(b) are vertical and horizontal section views of a combined longitudinal and FIG. 5 is a plot of the force-speed relationship for a single MR damper with no voltage and in a low speed range.
Figure 4B:
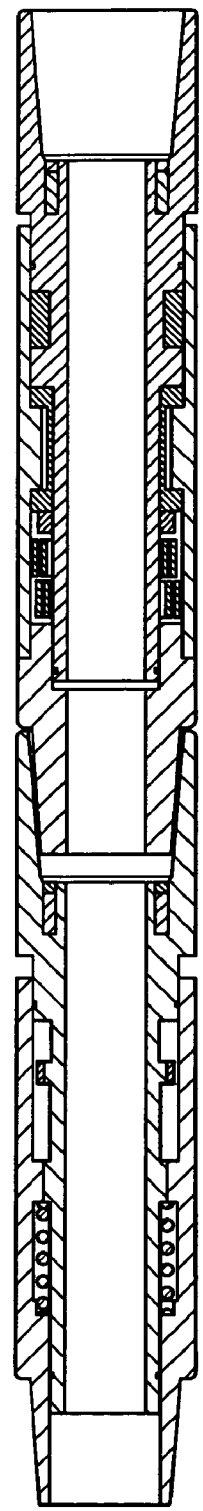

FIG. 4 illustrates the preferred damper of the invention for suppressing both longitudinal and rotational vibrations. This system consists of the direct coupling of the previously described embodiments. Since each damper responds to perturbations along different axes of motion they would be prescribed independently based upon the longitudinal and rotational properties of the drillstring configuration and subsequently coupled as shown.

Single Damper Characterization. In order to utilize dampers properly, it was essential to test a randomly chosen damper in order to understand its behavior. First, a damper (Lord Corp. #RD-1005) was trapped between the head and a load cell placed on the table of a milling machine. Load was gradually applied to the damper and its motion observed. It was found that the compressive load reached a maximum of 42.5 lb. beyond which the damper's inward movement occurred without appreciable change of load. A similar load of 25 lb. was encountered in connection with the damper's outward movement. The damper has an $N_2$ gas filled accumulator that provides the return force and allows for fluid expansion at elevated temperatures. Assuming the friction force to be the same at the same speed in either direction, the accumulator force was calculated to be 33.75 lb. Using the damper piston rod diameter of 0.4 inches, the accumulator pressure was calculated to be 268 PSIG. This agrees well with published data of a 20 bar gauge pressure (290 PSIG) in the accumulator.

Figure 5:
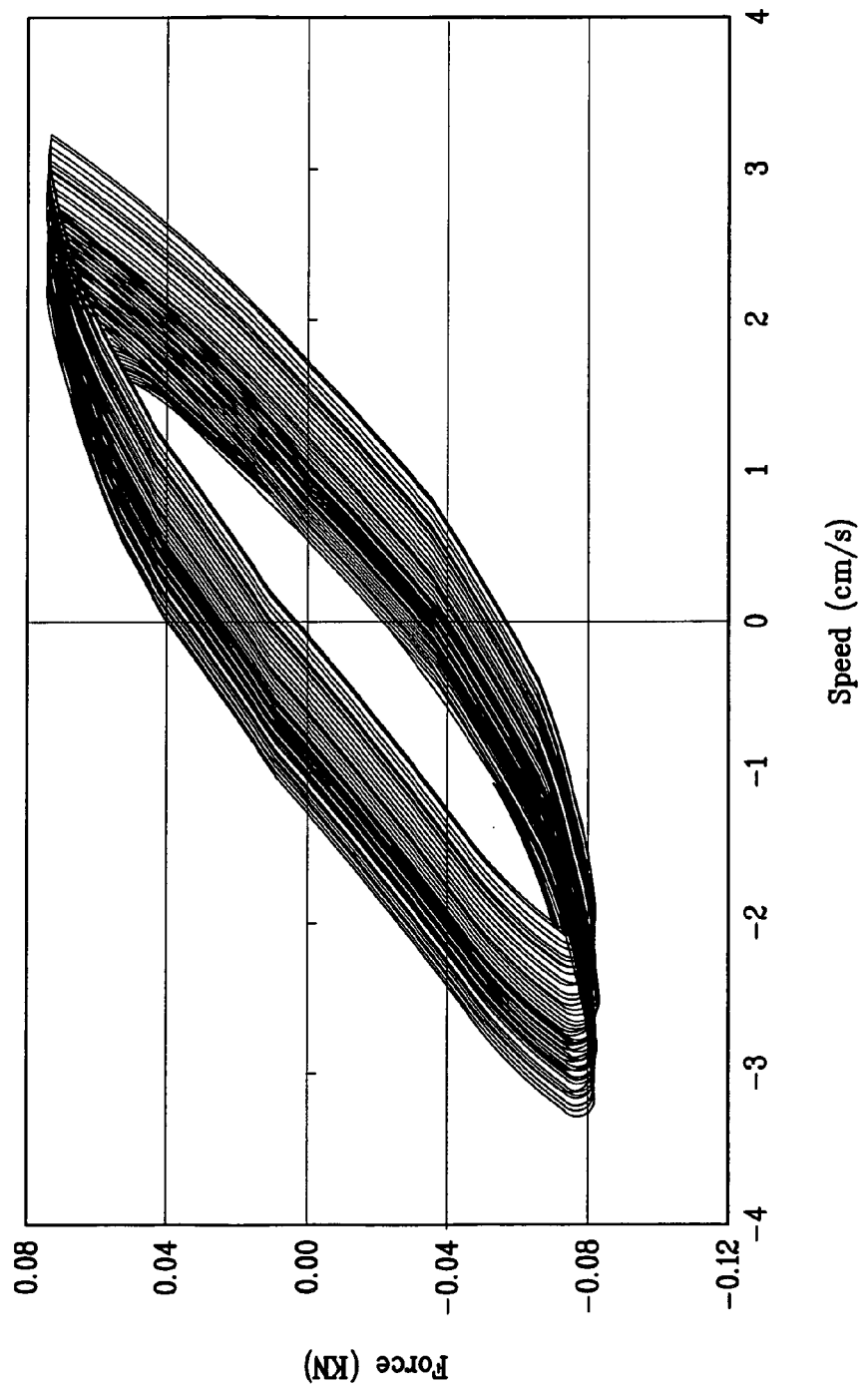

The next step was to determine the damper constant by measuring its force at different speeds. For that purpose, a Harmonic Excitation Fixture (HEF) was built. It was composed of a round plate (105 lb. weight) supported by three springs (27 lb./in. stiffness) to produce a Single-Degree-of-Freedom (SDOF) system with a natural frequency of 2.7 Hz. A single damper was connected at the center and supported through a force transducer. The system was excited through an electromagnetic shaker. An accelerometer was mounted near the center to measure the vibrations. Numerical integration of the accelerometer produced speed that was then plotted against the force measured by the force transducer. An approximate plot of the Force-Speed curve is shown in FIG. 5. As one can see, the maximum speed attained was approximately 3 cm/s.

Figure 6:
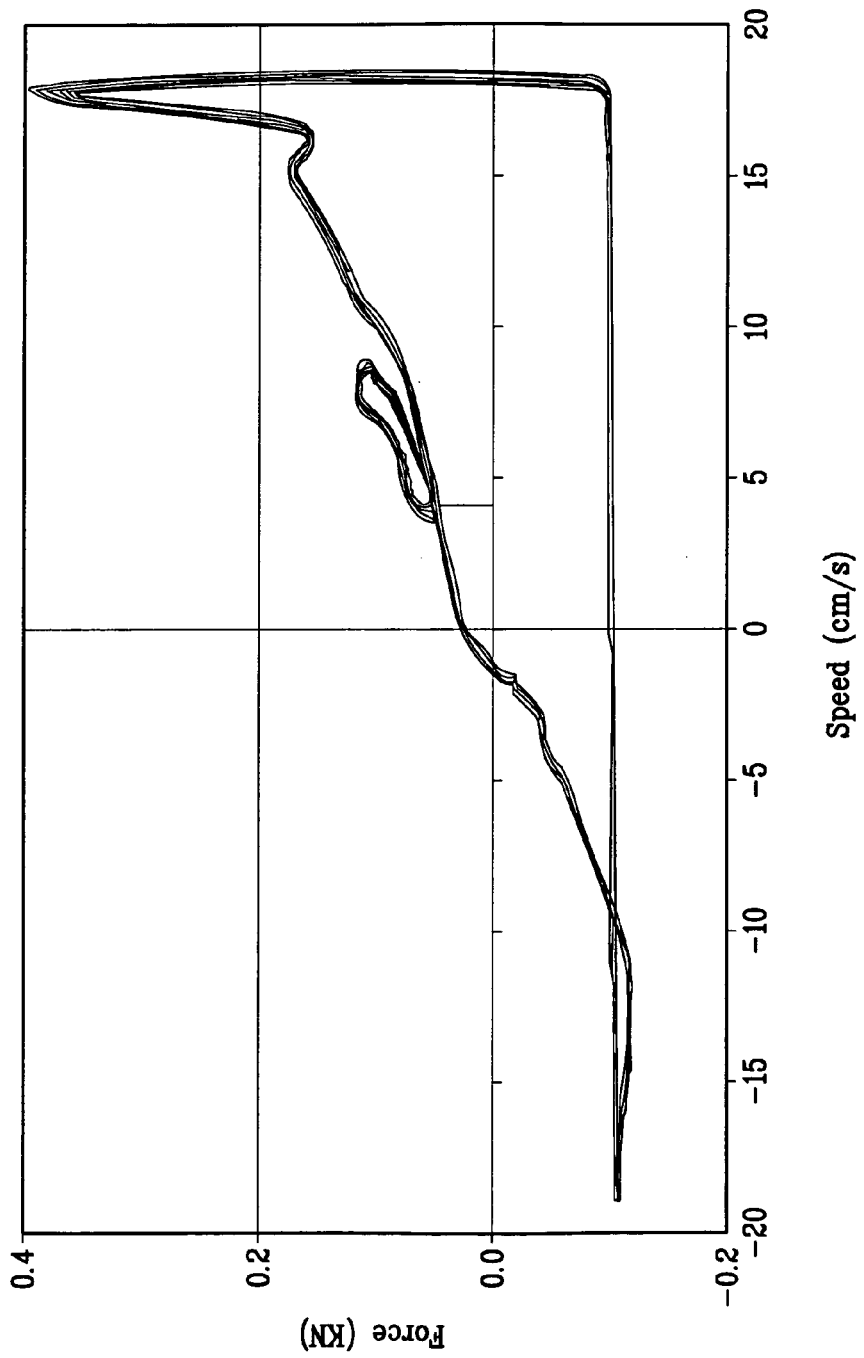
FIG. 6 is a plot of the force-speed relationship for a single MR damper with no voltage and in a high-speed range.
Figure 7:
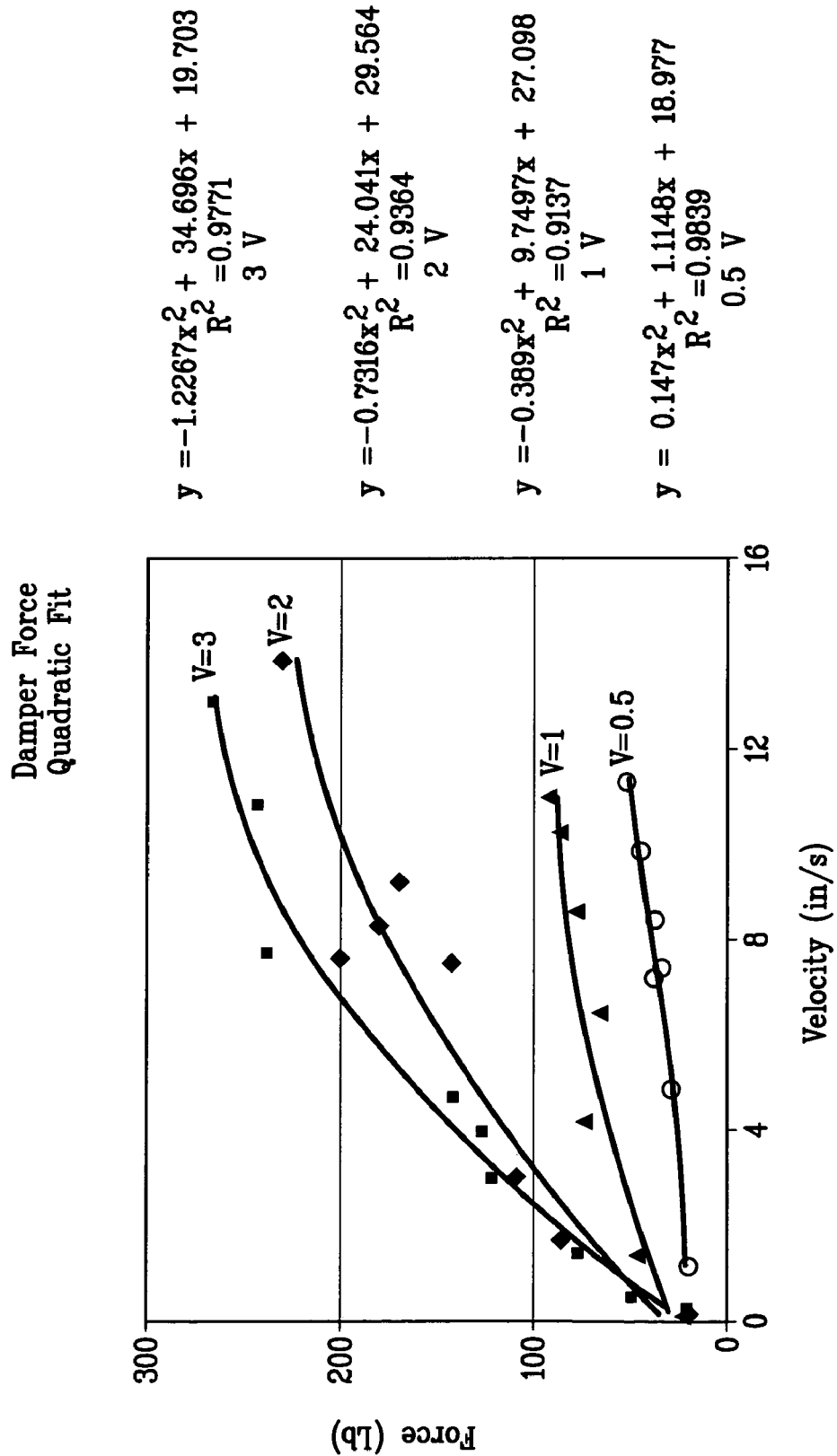
FIG. 7 is a plot of damper force at different speeds as the control voltage is varied; the data is curve-fit using a quadratic equation.

In order to increase the speed range, a different means of excitation was provided. A crank-connecting rod-piston arrangement was used to provide translation to the plate. A crank eccentricity of 0.25 inches was used. A force-speed plot is shown in FIG. 6. As can be seen, one was able to reach speeds of approximately 20 cm/s with this device. In order to obtain an expression for damper behavior as the control voltage is changed, the HEF was configured with a disk that has a rotating imbalance in order to impose a harmonic force on the damper. Changing the speed of the disk changes the frequency and magnitude of the force. Force amplitude is plotted against velocity within the damper in FIG. 7. The figure shows the equations resulting from a quadratic curve fit; the equations are used in damper control. The control voltage required to produce the required damping force at a given speed is calculated using the above equations and applied to the dampers.

Drilling Test Results. Drilling tests were conducted at Sandia National Laboratories' Hard-Rock Drilling Facility (HRDF). The HRDF test apparatus is described in detail by M. Elsayed, et al., supra (2000). Essentially a hydraulic motor is used to rotate a short drillstring equipped with a 3.25 inch diameter coring bit. The drillstring is connected to the drive motor through two counter-wound power springs thereby effecting rotational compliance representative of a field drillstring. The drillstring is also supported by compression springs to introduce compliance in the longitudinal direction. The bit contains three half-inch diameter PDC cutters. Hydraulic cylinders are used to support the spring-mass system and apply the WOB. A movable platform is used to locate and hold a 3×3×3-foot cube of rock for drilling. Water is used for a drilling fluid. The HRDF is fully instrumented to measure the ROP, WOB, speed, torque, and acceleration in several locations, along with bit longitudinal and rotational displacement. A computer is used for data acquisition and control. To test the present invention, a shock-sub test fixture comprised of selectable spring rates and MR fluid dampers was mounted in series with the drillstring. Control voltage was applied to the dampers to change their damping constant.

In what follows, a comparison is provided between bit vibrations for a drillstring with axial and torsional compliance but with a "rigid" shock sub and cases with a shock sub with different levels of compliance. The term "rigid" means that the shock sub is constrained so that its springs are unable to respond. All the shock subs have the same mass, and their compliance is expressed in terms of their natural frequencies, i.e., 32.39, 26.45 and 12.83 Hz. All shock subs are placed directly above the bit and included two controllable MR dampers. All tests were conducted at Sandia using the HRDF equipped with a PDC bit.

Rigid Sub in Hard Rock. The following tests were conducted with a rigid shock sub in hard rock, namely Sierra White Granite (SWG), to demonstrate the detrimental effect of severe chatter on bit life and production rate. Severe vibrations lead to significant impact loading on PDC bits, which leads to their failure.

Figure 8:
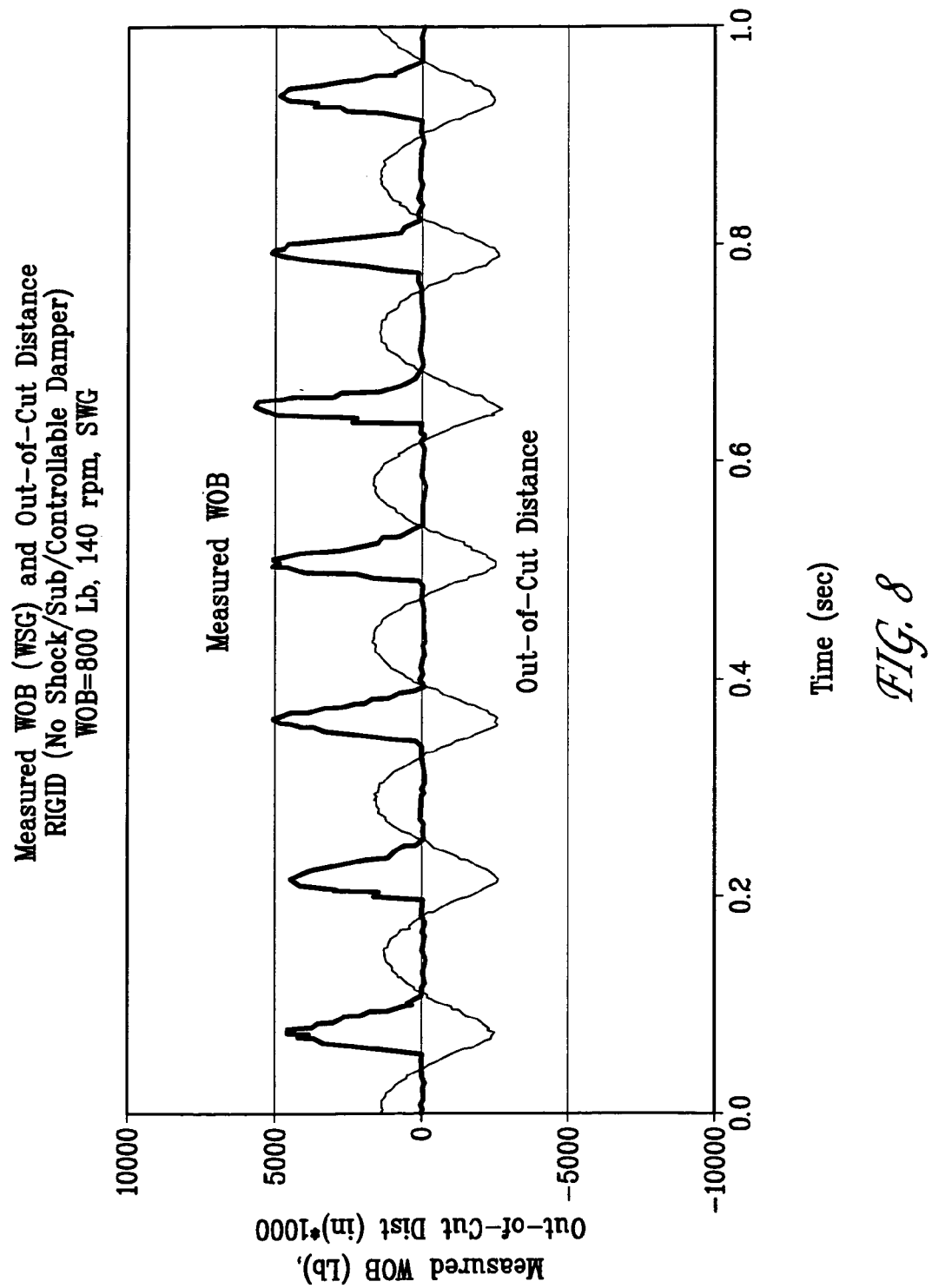
FIG. 8 is a plot of the measured WOB and out-of-cut distance versus time for a bit without a controllable damper shock-sub (800 lb. WOB and 140 RPM in Sierra White Granite)

The drilling test in FIG. 8 was conducted using a nominal WOB of 800 Lb and rotational speed of 140 RPM. The shock sub was locked in order to make it rigid. One sees that impact loading exceeds 5000 Lbs, more than 6 times the applied WOB. FIG. 8 also shows the Out-of-Cut Distance (OCD), a measure of bit position above the rock surface. It is clear from FIG. 8 that the OCD becomes positive indicating that the bit is above the rock surface releasing the bit force and rendering it equal to zero. This means that the bit has jumped out of the rock and, as it bounces back with negative values of the OCD, high impact loads are applied to the cutters.

Figure 9:
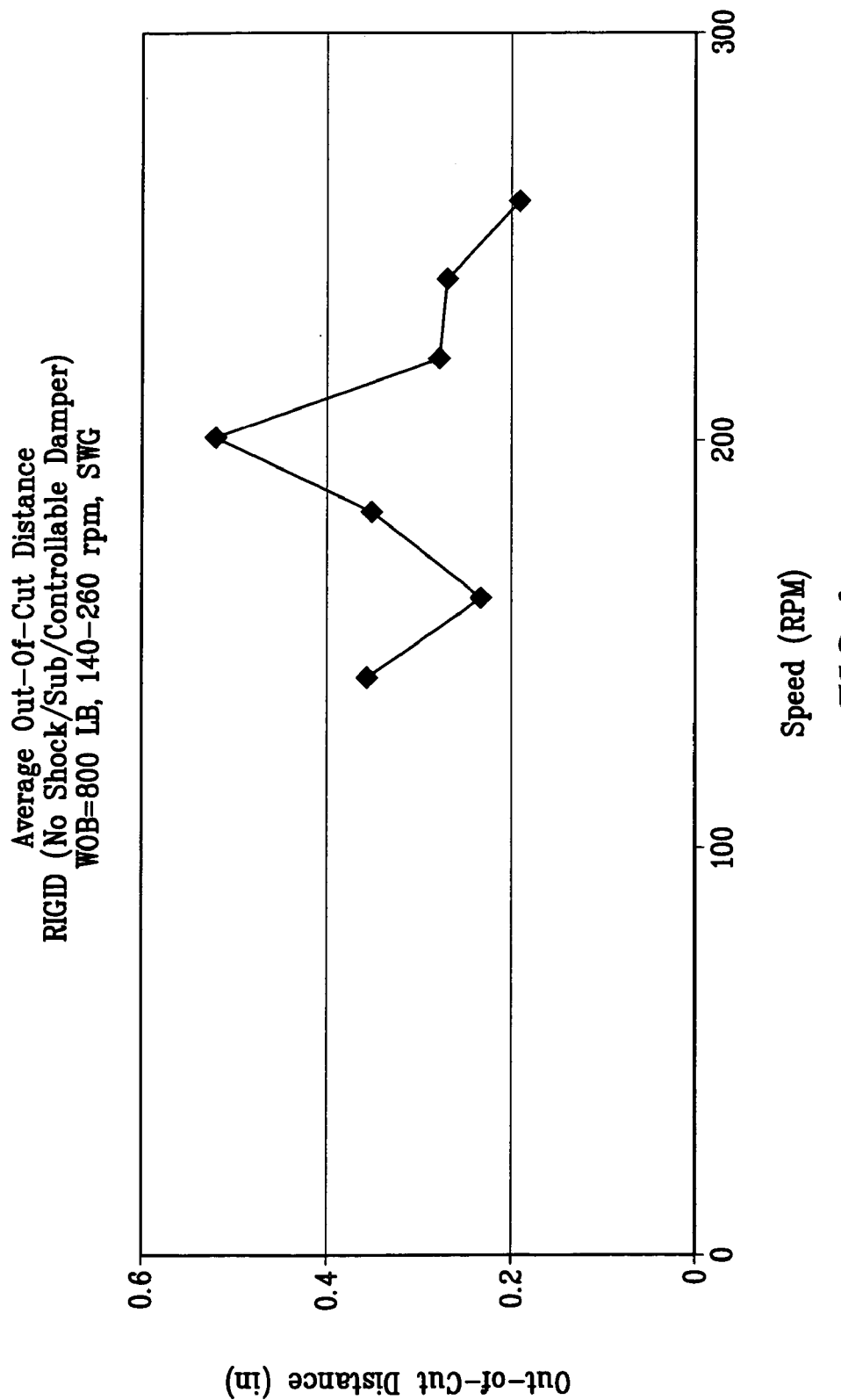
FIG. 9 is a plot of out-of-cut distance versus speed for a bit without a controllable damper shock-sub (800 lb. WOB at 140–260 RPM in Sierra White Granite)

FIG. 9 shows the peak OCD at 800 Lb WOB as speed is varied from 140–260 RPM. It is clear that at the worst case of 200 RPM, the OCD is over 0.5 inches indicating severe chatter and impact conditions.

Figure 10:
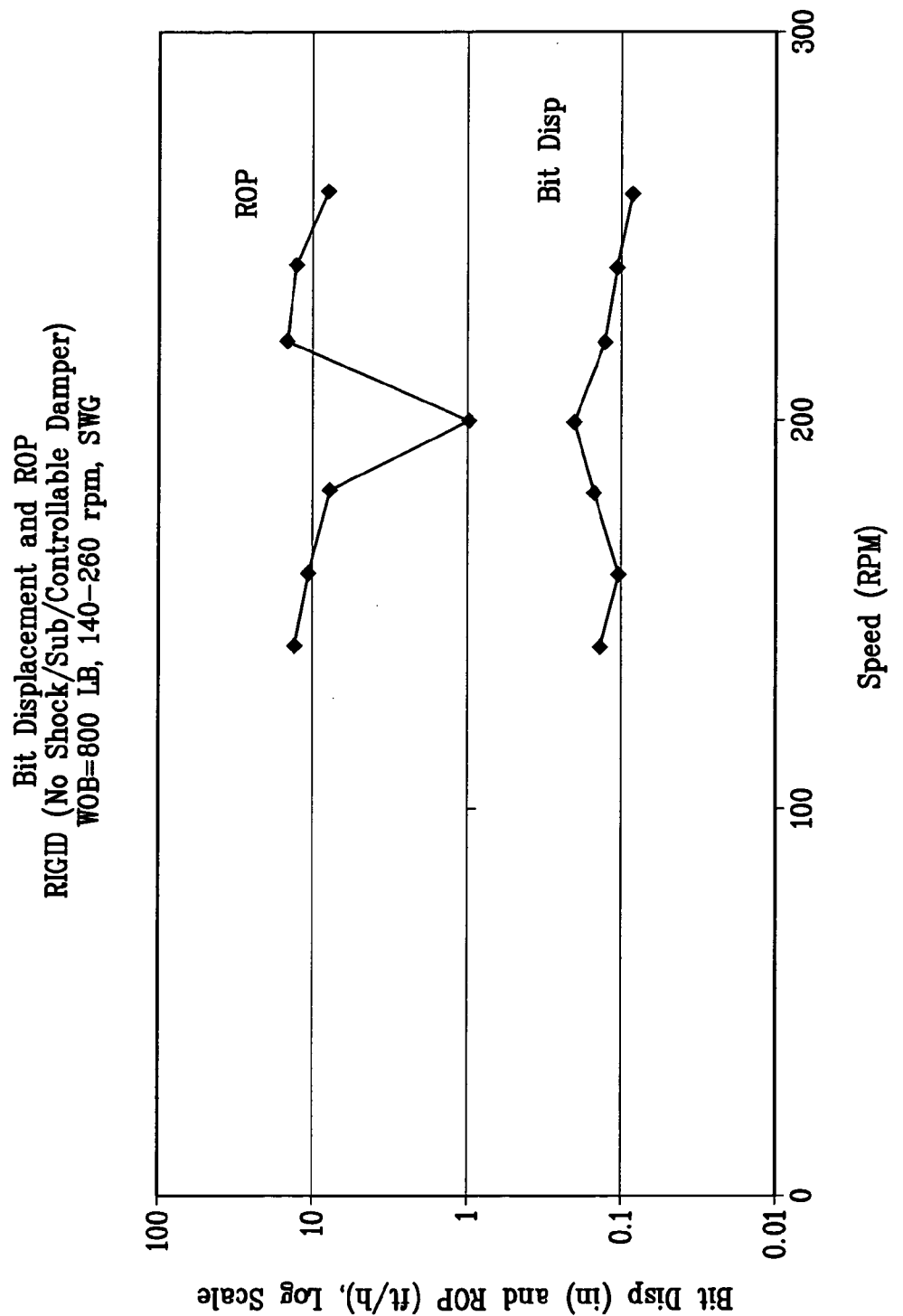
FIG. 10 is a plot of out-of-cut distance and the corresponding rate of penetration for a bit without a controllable damper shock-sub (800 lb. WOB at 140–260 RPM in Sierra White Granite)

FIG. 10 superimposes bit displacement over the ROP using a semi-log scale at 800 Lb WOB as the speed varies from 140–260 RPM. One sees that increased bit vibration at 200 RPM leads to a tremendous loss in the ROP where it became almost zero, i.e., no drilling was taking place. The importance of this condition to loss of penetration rate needs no explanation.

Controllable Damper Sub in Hard Rock The following plots show that using a shock sub with the proper stiffness and damping for a particular drillstring leads to reduction in vibrations. This in turn leads to improved bit life and increased ROP.

FIG. 11 shows the effect of using a 26.45 Hz shock sub with controllable MR dampers at 800 Lb WOB and 180 RPM in SWG. At zero control voltage, there are severe axial and torsional vibrations. Also notice the severe modulation caused by coupling of axial and torsional vibrations. Axial vibrations cause axial impact and torsional vibrations cause stick-slip, both detrimental to the bit. Notice also the severe variations in the ROP. When a control voltage of 1 volt is applied, vibrations settle down and the ROP stabilizes. Increasing the control voltage, beyond 1 volt, increases vibrations almost to that of a rigid system. Using a shock sub with a 1-volt control increased the ROP to about 10 ft/h instead of about 7 ft/h for the rigid case, a 43% increase.

Figure 12C:
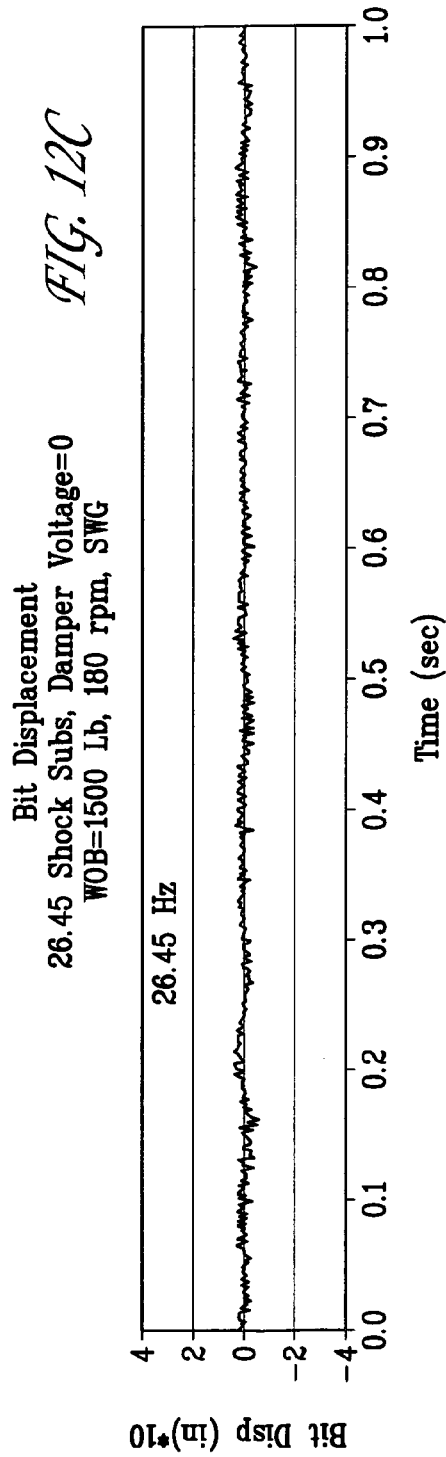
Figure 12D:
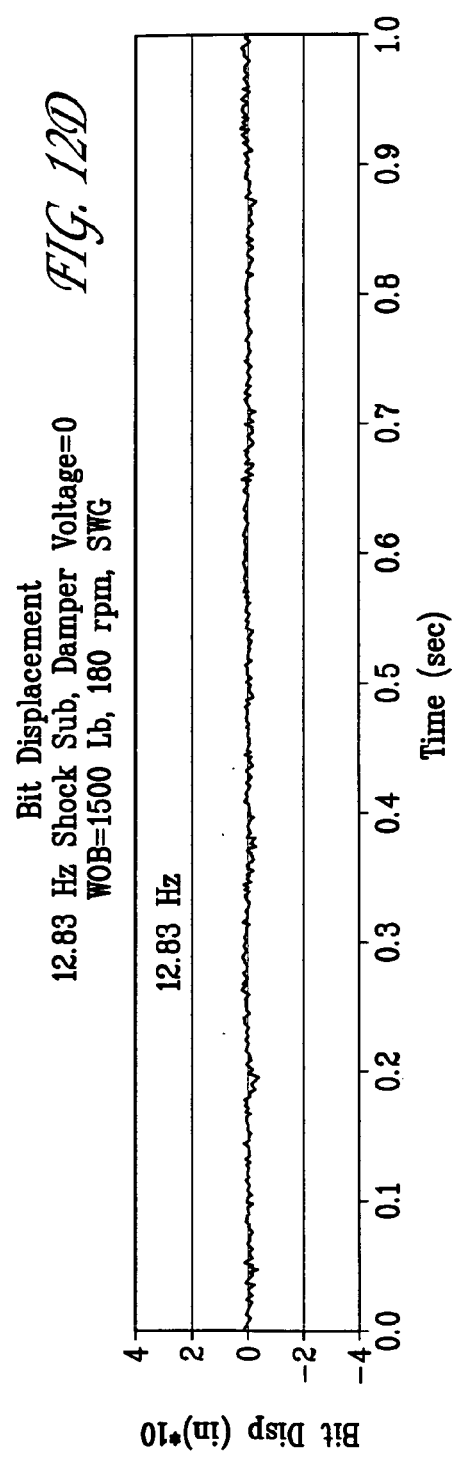

The importance of choosing the correct spring stiffness for the shock sub is shown in FIG. 12 for a 1500 Lb WOB and 180 RPM in SWG. This figure compares the effect of using 32.39, 26.45 and 12.83 Hz shock subs, with comparable damping levels, to a rigid system. The 12.83 Hz shock sub performs best. A similar plot is shown in FIG. 13 at 220 RPM. Here one sees that the 32.39 and 26.45 Hz shock subs are, in fact, worse than a rigid system, with the 12.83 Hz sub again being best.

Controllable Damper Sub in Soft Rock. The benefits of shock subs with controllable damping are not limited to hard rock. The following shows their benefits in a soft rock such as Sandstone.

FIG. 14 shows the results of tests conducted in Sandstone at 800 Lb WOB and 180 RPM. Again, one sees the tremendous reduction in bit vibrations with the 26.45 and 12.83 Hz shock subs. Also notice that a control voltage of 1 volt applied to the 12.83 Hz shock sub shows a superior performance to a 0 volt value. This again stresses the importance of controllability of the shock sub.

Figure 15:
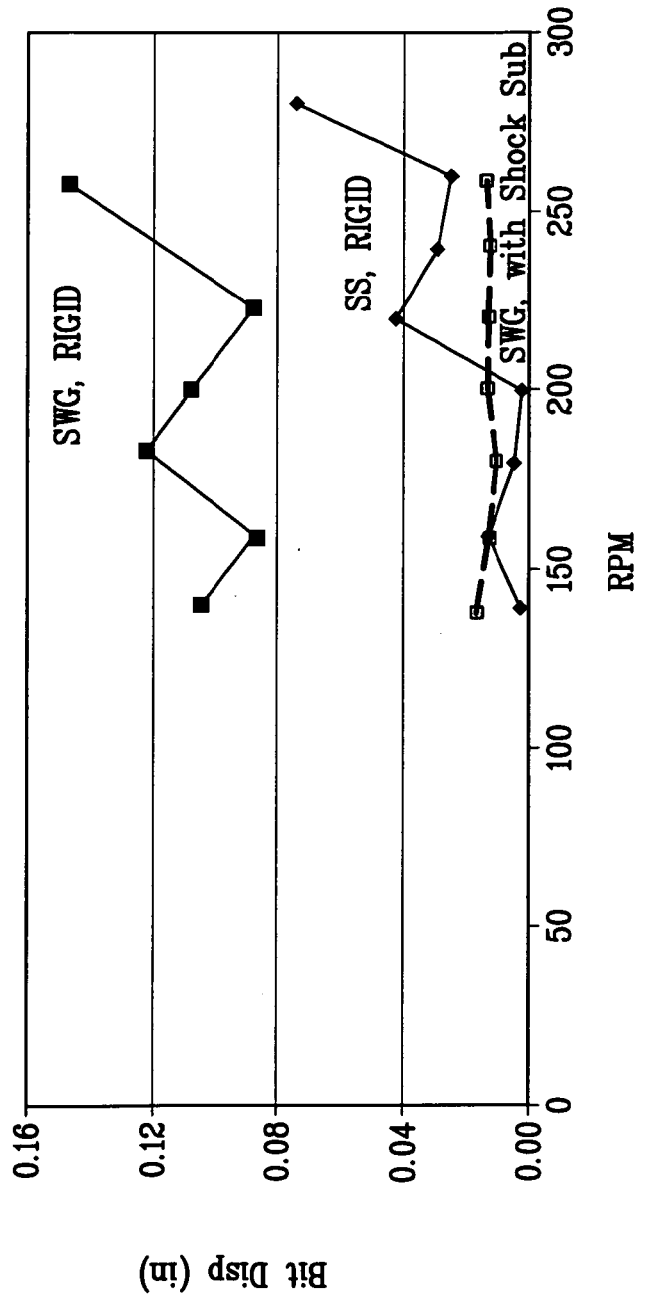
FIG. 15 is a plot of bit vibrations versus speed for a bit with and without a shock sub (1500 lb. WOB at 140–260 RPM in Sandstone and Sierra White Granite).

Controllable Damper Sub in Variable Rock Lithologies. An additional benefit of a controllable shock sub is its ability to mitigate the damaging effects of a bit/drillstring reacting to variable rock lithologies. FIG. 15 shows the bit vibrations at 140 to 260 RPM at 1500 lb. WOB for a rigid drillstring configuration yet in two different rock types. One can see that bit vibrations are much higher in Sierra White Granite than in Sandstone. Should a bit drilling in Sandstone encounter a hard stringer, its vibrations would suddenly increase. This would be detected by the control and the appropriate voltage would be sent to the MR damper, which would reduce bit vibrations. This is shown by superimposing a plot of bit vibrations in Sierra White Granite at the same WOB of 1500 lb., but equipped with a 12.83 Hz shock sub at zero control volts. One can easily see the significant reduction in vibrations as a result of using the shock sub. Since the resulting vibration level is so low in this case, no further change in control voltage is necessary.

The above testing showed the feasibility and benefits of using controllable damping in drillstrings. It was shown that the use of damping causes an increase in the ROP and decrease in the level of chatter. It was also shown that, with damping, the same ROP can be achieved with a lower WOB. An increase in the ROP leads to increased production. Coupled with reduced vibrations and/or decrease in the WOB, a PDC bit in a damped system will experience much reduced failure and wear rates. This reduces the overall cost of drilling, particularly in hard rock.

The present invention preferably adds a torsional shock sub as well. Theoretical work, M. Elsayed, "Evaluation of Longitudinal and Torsional Dynamic Forces in Drillstrings", *Developments in Theoretical and Applied Mechanics*, SEC-TAM Vol. XVIII, University of Alabama, pp. 549–563 (1996), as well as field experience show that torsional vibrations can be very destructive to PDC bits, particularly as the bit moves backwards in relationship to the rock. Mode coupling also exists between axial and torsional vibrations when drilling in hard rock with PDC bits. M. Elsayed, "Analysis of Coupling Between Axial and Torsional Vibration in a Compliant Model of a Drillstring Equipped with a PDC Bit", *ASME ETCE Conference Proceedings, Houston*, Tex., Paper # ETCE 2002/STRUC-29002 (February 2002). Coupled axial and torsional vibrations are damped by the preferred in-line axial/torsional controllable damper of the invention shown in FIG. 4.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A damping apparatus for a drillstring comprising a bit, said damping apparatus comprising a damping mechanism comprising magnetorheological fluid and means for generating an electromagnetic field affecting said magnetorheological fluid in response to changing ambient conditions encountered by the bit.

2. The damping apparatus of claim 1 wherein said damping mechanism dampens longitudinal vibrations.

3. The damping apparatus of claim 2 wherein said damping mechanism additionally dampens rotational vibrations.

4. The damping apparatus of claim 3 wherein said damping apparatus comprises two damping mechanisms in series.

5. The damping apparatus of claim 1 wherein said damping mechanism dampens rotational vibrations.

6. The damping apparatus of claim 1 wherein said magnetorheological fluid is housed in a chamber comprising an orifice between two sections of said chamber and wherein said generating means comprises an electromagnetic coil proximate said orifice.

7. A damping apparatus for a drillstring comprising a bit, said damping apparatus comprising a damping mechanism comprising means providing frictional properties that are alterable while the drillstring is in use, and means for controlling the frictional properties based upon changing ambient conditions encountered by the bit.

8. The damping apparatus of claim 7 wherein said damping mechanism dampens longitudinal vibrations.

9. The damping apparatus of claim 8 wherein said damping mechanism additionally dampens rotational vibrations.

10. The damping apparatus of claim 9 wherein said damping mechanism comprises two damping mechanisms in series.

11. The damping apparatus of claim 7 wherein said damping mechanism dampens rotational vibrations.

12. The damping apparatus of claim 7 wherein said means providing frictional properties comprises magnetorheological fluid.

13. The damping apparatus of claim 12 wherein said magnetorheological fluid is housed in a chamber comprising an orifice between two sections of said chamber and wherein said controlling means comprises an electromagnetic coil proximate said orifice.

14. A damping method for a drillstring comprising a bit, the method comprising the steps of:
    providing to the drillstring a damping mechanism comprising magnetorheological fluid; and
    generating an electromagnetic field affecting the magnetorheological fluid in response to changing ambient conditions encountered by the bit.

15. The damping method of claim 14 wherein the method dampens longitudinal vibrations.

16. The damping method of claim 15 wherein the method additionally dampens rotational vibrations.

17. The damping method of claim 16 wherein the providing step comprises providing two damping mechanisms in series and the generating step comprises generating one or more electromagnetic fields affecting the magnetorheological fluid in both damping mechanisms.

18. The damping method of claim 14 wherein the method dampens rotational vibrations.

19. The damping method of claim 14 wherein the providing step comprises housing the magnetorheological fluid in a chamber comprising an orifice between two sections of the chamber and wherein the generating step comprises employing an electromagnetic coil proximate the orifice.

20. A damping method for a drillstring comprising a bit, the method comprising the steps of:
    providing a damping mechanism comprising means providing frictional properties that are alterable while the drillstring is in use; and
    controlling the frictional properties based upon changing ambient conditions encountered by the bit.

21. The damping method of claim 20 wherein the method dampens longitudinal vibrations.

22. The damping method of claim 21 wherein the method additionally dampens rotational vibrations.

23. The damping method of claim 22 wherein the providing step comprises providing two damping mechanisms in series and the generating step comprises generating one or more electromagnetic fields affecting the magnetorheological fluid in both damping mechanisms.

24. The damping method of claim 20 wherein the method dampens rotational vibrations.

25. The damping method of claim 20 wherein in the providing step the means providing frictional properties comprises magnetorheological fluid.

26. The damping method of claim 25 wherein the providing step comprises housing the magnetorheological fluid in a chamber comprising an orifice between two sections of the chamber and wherein the controlling step comprises employing an electromagnetic coil proximate the orifice.

* * * * *